March 17, 1953

H. N. OSBON 2,631,729

MUD DEVICE

Filed April 13, 1946

HENRY N. OSBON.
INVENTOR.

BY Lester B Clark
+ Ray L. Smith

ATTORNEYS

March 17, 1953 H. N. OSBON 2,631,729
MUD DEVICE
Filed April 13, 1946 3 Sheets-Sheet 2

HENRY N. OSBON
INVENTOR.
BY Lester B. Clark
 & Ray L. Smith
ATTORNEYS

March 17, 1953 H. N. OSBON 2,631,729
MUD DEVICE

Filed April 13, 1946 3 Sheets-Sheet 3

HENRY N. OSBON.
INVENTOR.

BY Lester B Clark
+ Ray L. Smith
ATTORNEYS

UNITED STATES PATENT OFFICE 2,631,729

MUD DEVICE

Henry N. Osbon, Houston, Tex.

Application April 13, 1946, Serial No. 661,999

2 Claims. (Cl. 210—51)

The invention relates to a device for the processing of drilling mud used in the rotary method of drilling wells.

In the rotary method of drilling wells, a drilling liquid or drilling mud is pumped downwardly through the drill stem to discharge through the bit so as to pick up the cuttings and to perform various other characteristics during its circulation upwardly through the well bore. Of necessity the temperature of the mud increases in the well and this returning drilling mud carries with it considerable cuttings such as sand, shale and other materials which it is desirable to remove so that the mud may be cooled and recirculated into the well bore.

These contaminating materials have a specific gravity greater than the drilling liquid itself. Various types of shale shakers and rotating screens have been employed in attempts to remove this foreign matter. The old and established practice is to run the returning mud into a shallow pit where the foreign matter will settle by gravity and the mud can then be pumped off of the higher level of the pit. Such an arrangement, however, requires a substantial supply of the drilling mud so as to permit sufficient cooling and quiescence in the pit to permit settling out of the foreign matter. With present day operations where the drilling mud is usually compounded with various chemicals and heavying materials, for specific gravity control, a large volume of mud entails a substantial expense and very often the mud is dissipated due to the circulation and addition of various chemicals. Often the entire supply is soon discarded and replaced with a new quantity of mud.

The present invention therefore contemplates a piece of equipment which can be economically and readily provided at the well to receive the returning drilling mud and effect decontamination thereof together with other conditioning operations so that the mud may be returned immediately into the well bore. This substantially reduces the volume of mud which it is necessary to provide, and which results not only in a substantial saving, but a more satisfactory operation. It also "equalizes" or renders uniform the mud mixture which is constantly supplied to the well.

It is one of the objects of the invention to provide a conditioning device for drilling muds wherein the mud is pumped through a circular pipe at a relatively high rate of speed so as to cause the heavier particles of foreign matter to move radially outward so as to be carried along the outer periphery of the pipe so as to effect separation from the liquid travelling on the inner periphery of the pipe.

Another object of the invention is to provide a conditioner for drilling mud whereby foreign matter is thrown outwardly and liquid discharged inwardly of a circular pipe.

Still another object of the invention is to provide a conditioner for drilling muds wherein the mud is conditioned by being pumped through the machine and subjected to cooling so as to be recirculated immediately.

Another object of the invention is to provide a container wherein the mud from the return line is picked up by a pump and forced therethrough to condition it for immediate recirculation.

Another object of the invention is to provide a means and method of processing drilling mud so as to eliminate storage of the mud, the volume of mud required, and to protect the mud from dilution and drainage.

A further object of the invention is to provide a container wherein mud from the well bore and freshly made up mud, are circulated to provide a mud mix of uniform weight.

Still another object of the invention is to provide a mechanism wherein a uniform mud mixture is supplied to the well bore.

Still another object of the invention is to provide a container in which water or other materials may be added to the mud in processing the mud for recirculation.

Still another object of the invention is to provide a tank which may be utilized as a source of storage for a quantity of drilling mud.

Other and further objects of the invention will be readily apparent when the following description is considered in connection with the accompanying drawings wherein.

Figure 1:
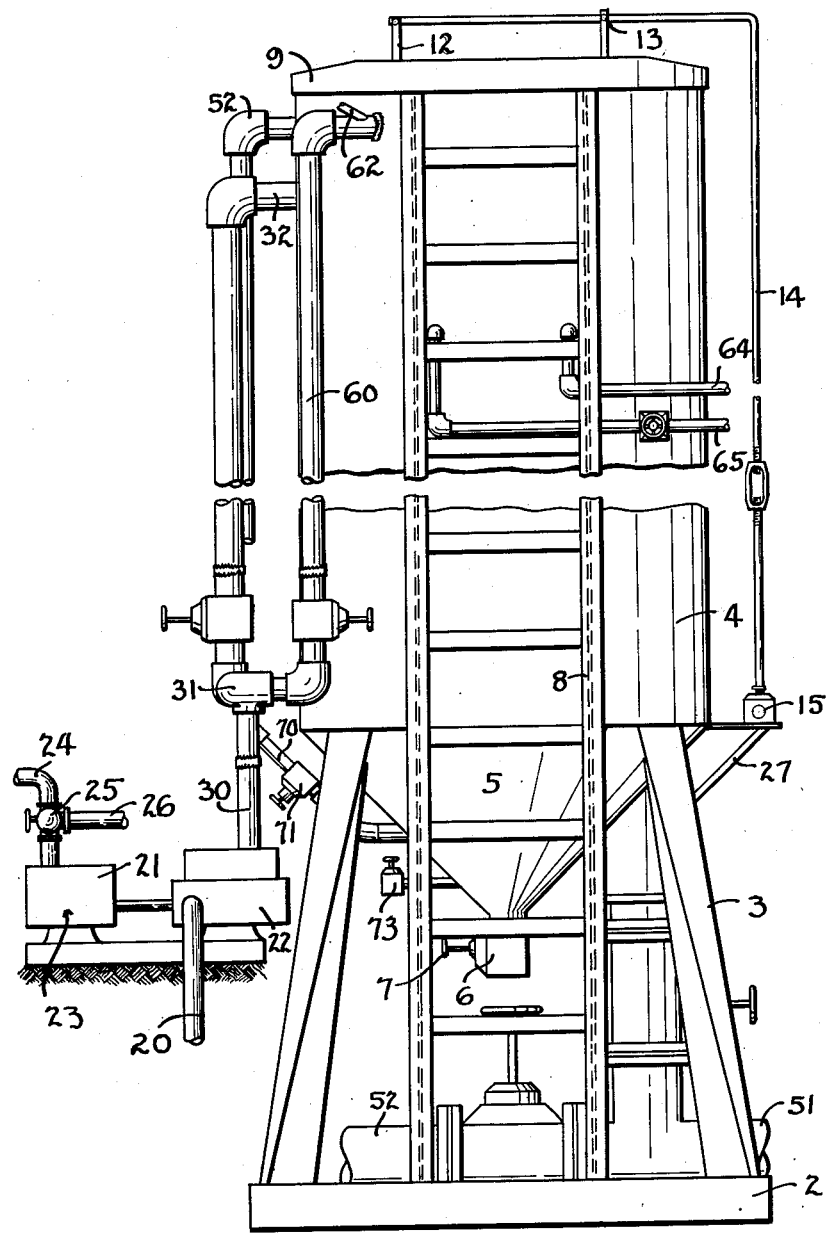
Fig. 1 is a side elevation of the desanding device arranged in position ready for operation.
Figure 2:
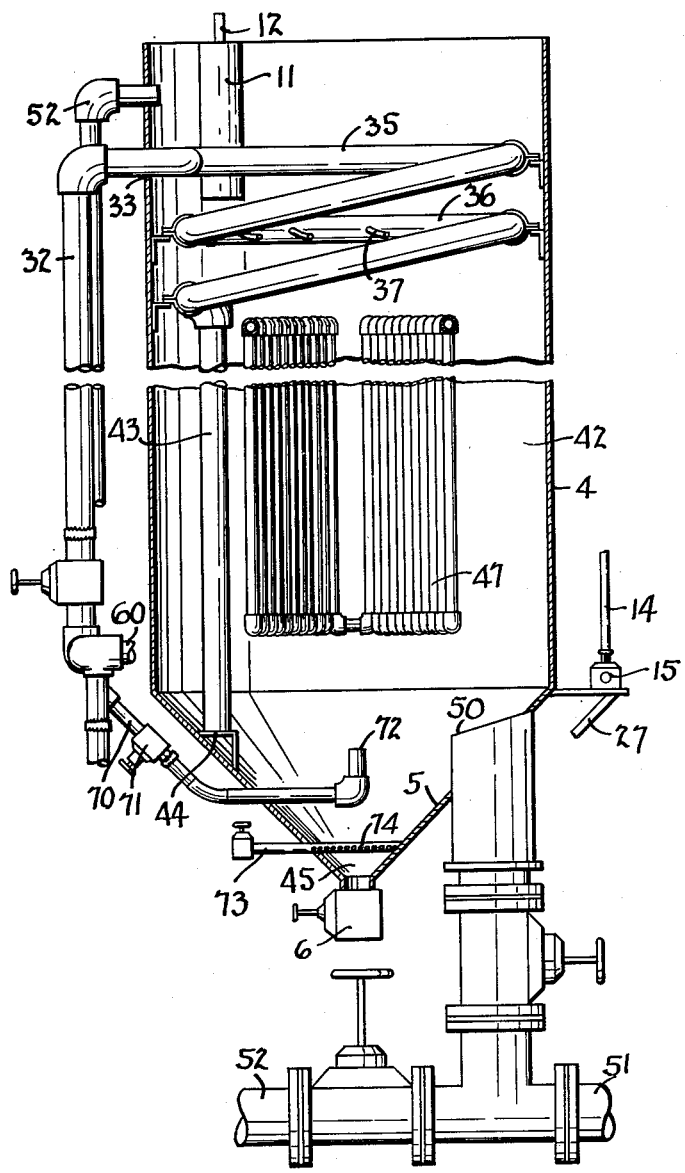
Fig. 2 is a vertical sectional view of the desander device and illustrating the internal arrangement of the parts.

In Fig. 1 a base 2 carries the supporting standard 3 by which the tank 4 is supported in position. This tank may be of any desired size and configuration, but preferably has a conical bottom 5 having the discharge outlet 6 controlled by the valve 7.

A ladder 8 may provide access to the top of the tank which is preferably closed by a cover 9.

In order to show the elevation of liquid in the tank, a float 10 is arranged adjacent the top of the tank and protected by a shield 11. This float is connected to a rod 12 pivoted at 13 on the tank so as to actuate a connection 14 to a suitable control mechanism 15. In this manner the liquid level in the tank may be controlled.

In actual operation the return line for the drilling mud will be connected to the pipe 20 so as to furnish mud to a pump 21 and particularly to the mud end 22 thereof. This pump has the steam end 23 which will be operated by a supply of steam through the pipe 24. Control valve 25 may be used to govern the flow of steam to the pump. The pipe 26 will be connected to a pipe 27 leading from the control mechanism 15. In this manner the pump may be turned on or off in accordance with the level of liquid in the tank 4.

Figure 3:
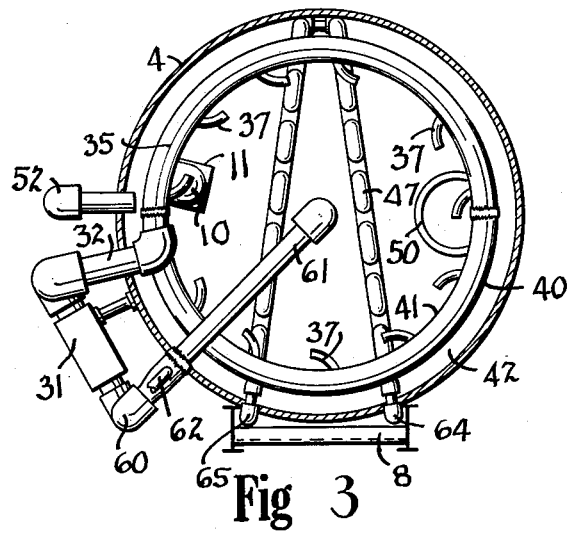
Fig. 3 is a top plan view looking down on the desander tank.

The discharge pipe 30 from the pump extends up into the fitting 31 and continues as a pipe 32 entering the tank at 33. The pipe 32 is best seen in Fig. 3 as being connected to a circular pipe 35. This circular pipe 35 is a blank pipe for one circle, and as it enters the second circle 36 it is provided with a plurality of outlet nozzles 37. These nozzles are best seen in Fig. 3 as extending substantially tangent to the pipe end from the inside periphery thereof, being directed in the path of movement of the liquid or mud being pumped through the pipe.

It seems obvious that any heavier particles of material will be cast outwardly toward the periphery 40 of the circular pipe while the lighter liquid will move toward the inside periphery 41 on the inside of the pipe. This liquid will, of course, tend to discharge through the nozzles 37 into the interior 42 of the tank.

As many circles of the pipe may be provided as are deemed necessary, but the end of this pipe is then connected to the down pipe 43 resting on the shoulder 44 in the conical portion 5 of the tank. The fact that the circular portion 36 of the pipe is inclined downwardly and due to the rate of travel of the mud in the pipe, it is intended that the separating heavier particles will be carried along into the down pipe 43 to discharge on to the inclined conical surface of the base of the tank. This heavy material will in this manner settle into the base portion 45 of the tank to be removed through the valve 6.

Figure 4:
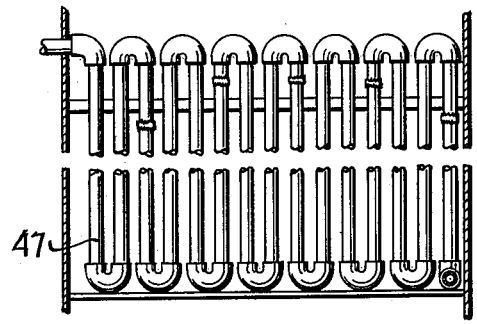
Fig. 4 is a broken detail view illustrating the arrangement of one of the cooling units.

The liquid discharging from the nozzles 37 into the interior 42 of the tank circles gradually past a plurality of cooling units 47 in the interior of the tank. These cooling units may be connected to any desirable source of cooling liquid or fluid, and are preferably made up in the form of a radiator as seen in Fig. 4.

As the processed liquid moves downwardly in the tank it can be withdrawn from the outlet 50 through the pipe 51 to the standard form of slush pump used in circulating the mud back into the well bore. A pipe 52 may be connected to discharge this mud to any other location desired. It will be noted that the top of the pipe 50 is slightly above the shoulder 44 so that the liquid being taken off from the tank will be above the elevation of the abrasive materials being extracted from the mud.

It is often desirable to add other materials to the drilling mud such as various types of mud heaviers, chemical viscosity reducing heaviers, or water, and to effect these operations a pipe 60 leads off from the fitting 31 and enters the tank as best seen in Fig. 3. In order to introduce additives to this pipe, a fitting 62 is provided and, of course, the flow of liquid through the pipe 60 will tend to create a vacuum so as to draw any of these materials into the pipe. The discharge from this pipe is into the center of the tank so that the materials will be uniformly mixed.

The circulation of the cooling liquid is accomplished by the pipes 64 and 65 best seen in Fig. 1.

In some instances it is desirable to further agitate the contents of the tank, and to this end a supplemental pipe 70 from the fitting 31 and controlled by a valve 71 discharges at 72 interiorly of the tank.

In order to facilitate the discharge of the foreign matter from the base of the tank, a pipe 73 discharges at 74 tending to direct the sand out of the bottom of the tank.

The nozzles 37 may, of course, be arranged to obtain the most efficient operation, but it has been found that if these nozzles extend inwardly 30° from the tangent of the pipe, and downwardly 30°, satisfactory operation may be obtained. This mechanism may be used for the purpose of measuring the amount of mud being pumped into the well, it may be used to mix any particular batch or slug of mud to be forced into the well, or for adding water or other ingredients to the mud.

With this arrangement the mud is protected against dilution by rain, as now occurs when the mud is in an open pit, and prevents any rain water from draining into the mud as now occurs.

The volume of mud necessary to continuously operate the well is substantially reduced because none remains in storage in the usual form of slush pits. Furthermore, any material fluctuation in the level of the mud in the tank, or the amount of admixed mud to maintain a constant level, immediately indicates a variation in drilling conditions, such as gas cutting of the mud, penetration of cavities, etc., whereby necessary steps can be taken to prevent blowout or other undesirable results.

The size of the tank may be so determined that the volume of the tank per inch of elevation is known so that movement of the gauge can be used to determine the volume.

Broadly the invention contemplates method and apparatus for conditioning mud for recirculation in the rotary method of drilling wells.

The invention claimed is:

1. A conditioning device for drilling mud comprising a tank, a pump to elevate the mud returning from the well and to apply a pressure thereto, a line from said pump adjacent the top of said tank, a circular coil connected to said line to conduct the mud in a circular direction to set up a centrifugal force therein so as to direct any heavier particles therein to the outer side of said coil, a plurality of discharge nozzles spaced along a portion of said pipe which are directed inwardly and downwardly along the inner side of said portion to allow the escape into the tank of the lighter weight liquid, a down pipe at the end of said coil to discharge the heavier particles from the coil at a point adjacent the bottom of the tank, and an outlet from the tank below said coil and above the discharge of the heavier particles to take off the conditioned liquid.

2. A conditioning device for drilling mud comprising a tank, a pump to elevate the mud returning from the well and to apply a pressure thereto, a line from said pump adjacent the top of said tank, a circular coil connected to said line to conduct the mud in a circular direction to set up a centrifugal force therein so as to direct any heavier particles therein to the outer side of said coil, a plurality of discharge nozzles spaced along a portion of said pipe which are directed inwardly and downwardly along the inner side of said portion to allow the escape into the tank of the lighter weight liquid, a down pipe at the end of said coil to discharge the heavier particles from the coil at a point adjacent the bottom of the tank, an outlet from the tank below said coil and above the discharge of the heavier particles to take off the conditioned liquid, and means in said tank between the coil and outlet to cool the conditioned liquid.

HENRY N. OSBON.

REFERENCES CITED

The following references are of record in the file of this patent:

UNITED STATES PATENTS

| Number | Name | Date |
|---|---|---|
| 353,775 | Booraem | Dec. 7, 1886 |
| 729,349 | Hutchinson | May 26, 1903 |
| 958,942 | Seymour | May 24, 1910 |
| 972,281 | Stamets | Oct. 11, 1910 |
| 972,282 | Stamets | Oct. 11, 1910 |
| 1,799,684 | Gilbert et al. | Apr. 7, 1931 |
| 1,833,390 | Carter | Nov. 24, 1931 |
| 1,847,864 | Cross | Mar. 1, 1932 |
| 1,880,185 | Kerns et al. | Sept. 27, 1932 |
| 1,881,176 | Epley | Oct. 4, 1932 |
| 2,003,140 | Dehn | May 28, 1935 |
| 2,048,158 | Goodwin | July 21, 1936 |
| 2,338,174 | Garrison | Jan. 4, 1944 |
| 2,426,327 | Unerwood | Aug. 26, 1947 |
| 2,432,308 | Goodyer | Dec. 9, 1947 |

FOREIGN PATENTS

| Number | Country | Date |
|---|---|---|
| 124,130 | Great Britain | Mar. 20, 1919 |
| 607,957 | France | Dec. 14, 1925 |